(12) United States Patent
Tsunashima et al.

(10) Patent No.: US 7,199,801 B2
(45) Date of Patent: Apr. 3, 2007

(54) IMAGE PROCESSING APPARATUS AND IMAGE PROCESSING METHOD (75) Inventors: Tadaaki Tsunashima, Tokyo (JP); Kazuki Araki, Tokyo (JP); Naoya Hatsumi, Tokyo (JP); Toru Nagai, Tokyo (JP)

(73) Assignees: Konami Corporation, Tokyo (JP); Konami Computer Entertainment Tokyo, Inc., Tokyo (JP)

(*) Notice: Subject to any disclaimer, the term of this patent is extended or adjusted under 35 U.S.C. 154(b) by 0 days.

(21) Appl. No.: 10/846,596

(22) Filed: May 17, 2004

(65) Prior Publication Data

US 2004/0239678 A1 Dec. 2, 2004

(30) Foreign Application Priority Data

May 30, 2003 (JP) ............................. 2003-154926
Jun. 30, 2003 (JP) ............................. 2003-188427

(51) Int. Cl.
*G06T 11/40* (2006.01)
*G09G 5/00* (2006.01)

(52) U.S. Cl. ..................................... 345/552; 345/582

(58) Field of Classification Search ............... 345/552, 345/582, 419, 473, 474, 953, 949; 382/285
See application file for complete search history.

(56) References Cited

U.S. PATENT DOCUMENTS

| | | | |
|---|---|---|---|
| 6,097,396 A * | 8/2000 | Rouet et al. ................. | 345/582 |
| 6,351,266 B1 | 2/2002 | Kobayashi et al. | |
| 6,417,854 B1 | 7/2002 | Isowaki et al. | |
| 6,862,374 B1 * | 3/2005 | Nagai et al. ................. | 345/419 |
| 6,879,323 B1 * | 4/2005 | Takezawa et al. .......... | 345/420 |
| 6,940,508 B2 * | 9/2005 | Lengyel ....................... | 345/428 |

FOREIGN PATENT DOCUMENTS

| | | |
|---|---|---|
| EP | 1 139292 A2 | 10/2001 |
| JP | 1-142992 A | 6/1989 |
| JP | 06-348246 A | 12/1994 |
| JP | 0 615 223 B1 | 6/1997 |

(Continued)

OTHER PUBLICATIONS

Imagination Technologies Ltd (Power VR): "The Stencil Buffer" www.pvrdev.com, [Online] May 16, 2000, XP002379879 Retrieved from the Internet: URL:http//www.pvrdev.com/pub/PC/doc/f/The%20Stencil%20Buffer.htm> [retrieved on May 8, 2006] *p. 3, section "Dissolves"*.

(Continued)

*Primary Examiner*—Kee M. Tung
*Assistant Examiner*—Hau H. Nguyen
(74) *Attorney, Agent, or Firm*—Sughrue Mion, PLLC (57) ABSTRACT

To provide an image processing apparatus that enables display of a situation where all or a part of a display image changes using simple image processing. A first texture image, a second texture image, display priority of each pixel constituting the first texture image and a threshold value of the display priority are stored in advance. The second texture image is drawn on a predetermined polygon (S205), and the first texture image is further drawn thereon in accordance with the result of comparison between the display priority and the threshold value (S206).

9 Claims, 7 Drawing Sheets

| | FOREIGN PATENT DOCUMENTS | |
|----|----|----|
| JP | 11-296157 A | 10/1999 |
| JP | 2000-3455 A | 1/2000 |
| JP | 2001-84390 A | 3/2001 |
| JP | 2001-229403 A | 8/2001 |
| JP | 2002-319033 A | 10/2002 |

OTHER PUBLICATIONS

Bakay, Lalonde, Heidrich: "Rael Time Animated Grass" Proc, Eurographics Workshop 2002, Mar. 25, 2002, XP002379880 *p. 2, right-hand col. figure 3*.

* cited by examiner

α VALUE DECREASE

IMAGE PROCESSING APPARATUS AND IMAGE PROCESSING METHOD

BACKGROUND OF THE INVENTION

This invention relates to an image processing apparatus and an image processing method, and particularly to an image processing apparatus and an image processing method that enable change of all or a part of a display image by simple image processing.

There has been known an image processing apparatus such as a game apparatus that arranges a character object and point of view in a virtual three-dimensional space and displays the view in the space viewed from the point of view on a monitor. With such an apparatus, virtual reality can be achieved.

If growth of the hair of the character object arranged in the virtual three-dimensional space can be simply expressed in accordance with a user's setting or with the passage of time, it is expected that virtual reality can be improved further. Similarly, if an object getting wet with a liquid such as water and a liquid such as water oozing out from an object can be simply expressed, this is expected to contribute to providing a more realistic virtual reality.

SUMMARY OF THE INVENTION

In view of the foregoing problems, it is a first object of this invention to provide an image processing apparatus and an image processing method that enable display of growth of hair such as that of the head of a game character by simple image processing.

It is a second object of this invention to provide an image processing apparatus and an image processing method that enable change of all or a part of a display image by simple image processing.

In order to solve the foregoing problems, an image processing apparatus according to this invention is an image processing apparatus for displaying an image of a character, characterized in that the apparatus includes hair texture image storage means for storing a hair texture image representing hair of the character, skin texture image storage means for storing a skin texture image representing skin of the character, display priority storage means for storing display priority given to each pixel constituting the hair texture image, threshold value storage means for storing a threshold value of the display priority, skin texture image drawing means for drawing the skin texture image stored in the skin texture image storage means on a polygon representing the character, and hair texture image plotting means for drawing the hair texture image stored in the hair texture image storage means on the polygon on which the skin texture image has been drawn by the skin texture image drawing means, in response to a result of comparison between the display priority stored in the display priority storage means and the threshold value stored in the threshold value storage means.

An image processing method according to this invention is an image processing method for displaying an image of a character, characterized in that the method includes a hair texture image storage step of storing a hair texture image representing hair of the character to hair texture image storage means, a skin texture image storage step of storing a skin texture image representing skin of the character to skin texture image storage means, a display priority storage step of storing display priority given to each pixel constituting the hair texture image to display priority storage means, a threshold value storage step of storing a threshold value of the display priority to threshold value storage means, a skin texture image drawing step of drawing the skin texture image stored in the skin texture image storage means on a polygon representing the character, and a hair texture image drawing step of drawing the hair texture image stored in the hair texture image storage means on the polygon on which the skin texture image has been drawn by the skin texture image drawing means, in response to a result of comparison between the display priority stored in the display priority storage means and the threshold value stored in the threshold value storage means.

A computer-readable information storage medium according to this invention has a program stored therein, the program being adapted for causing a computer such as a personal computer, home game machine, commercial game machine, portable game machine, personal digital assistant, portable telephone or home server to function as an image processing apparatus for displaying an image of a character, the program including commands to cause the computer to function as hair texture image storage means for storing a hair texture image representing hair of the character, skin texture image storage means for storing a skin texture image representing skin of the character, display priority storage means for storing display priority given to each pixel constituting the hair texture image, threshold value storage means for storing a threshold value of the display priority, skin texture image drawing means for drawing the skin texture image stored in the skin texture image storage means on a polygon representing the character, and hair texture image drawing means for drawing the hair texture image stored in the hair texture image storage means on the polygon on which the skin texture image has been drawn by the skin texture image drawing means, in response to a result of comparison between the display priority stored in the display priority storage means and the threshold value stored in the threshold value storage means.

In this invention, for example, a skin texture image representing a situation where no hair has grown is drawn on a polygon representing the character. Then, in this invention, display priority given to each pixel constituting a hair texture image is stored, and the hair texture image is further drawn in response to the result of comparison between this display priority and a threshold. The hair texture image represents, for example, a situation where hair has fully grown. According to this invention, it becomes possible to suitably display growth of hair (hair of head, beard and the like) by relatively simple image processing.

The hair texture image drawing means may perform drawing of the pixel on the polygon on which the skin texture image has been drawn by the skin texture image drawing means, in response to a result of comparison between the display priority given to each pixel stored in the display priority storage means and the threshold value stored in the threshold value storage means. The display priority storage means may store the display priority given to each pixel as an alpha value of the hair texture image.

Moreover, an image processing apparatus according to this invention is characterized in that the apparatus includes first texture image storage means for storing a first texture image, second texture image storage means for storing a second texture image, display priority storage means for storing display priority given to each pixel constituting the first texture image, threshold value storage means for storing a threshold value of the display priority, second texture image drawing means for drawing the second texture image stored in the second texture image storage means on a polygon associated with the first and second texture images, and first texture image drawing means for drawing the first texture image stored in the first texture image storage means on the polygon on which the second texture image has been drawn by the second texture image drawing means, in response to a result of comparison between the display priority stored in the display priority storage means and the threshold value stored in the threshold value storage means.

Moreover, an image processing method according to this invention is characterized in that the method includes a first texture image storage step of storing a first texture image to first texture image storage means, a second texture image storage step of storing a second texture image to second texture image storage means, a display priority storage step of storing display priority given to each pixel constituting the first texture image to display priority storage means, a threshold value storage step of storing a threshold value of the display priority to threshold value storage means, a second texture image drawing step of drawing the second texture image stored in the second texture image storage means on a polygon associated with the first and second texture images, and a first texture image drawing step of drawing the first texture image stored in the first texture image storage means on the polygon on which the second texture image has been drawn by the second texture image drawing means, in response to a result of comparison between the display priority stored in the display priority storage means and the threshold value stored in the threshold value storage means.

Moreover, a computer-readable information storage medium according to this invention has a program stored therein, the program being adapted for causing a computer such as a personal computer, home game machine, commercial game machine, portable game machine, portable digital assistant, portable telephone or home server to function as first texture image storage means for storing a first texture image, second texture image storage means for storing a second texture image, display priority storage means for storing display priority given to each pixel constituting the first texture image, threshold value storage means for storing a threshold value of the display priority, second texture image drawing means for drawing the second texture image stored in the second texture image storage means on a polygon associated with the first and second texture images, and first texture image drawing means for drawing the first texture image stored in the first texture image storage means on the polygon on which the second texture image has been drawn by the second texture image drawing means, in response to a result of comparison between the display priority stored in the display priority storage means and the threshold value stored in the threshold value storage means.

In this invention, a second texture image is drawn. Display priority given to each pixel constituting a first texture image is stored, and the second texture image is further drawn in response to the result of comparison between this display priority and a threshold value. According to this invention, by relatively simple image processing, all or a part of the second texture image can be replaced with the first texture image in accordance with the storage contents in the display priority storage means, and changing of all or a part of the image can be expressed.

In an embodiment of this invention, the first texture image is an image representing an object associated with the polygon after a predetermined change occurred in the object, and the second texture image is an image representing the object associated with the polygon before the predetermined change occurs in the object. The display priority storage means stores the display priority to follow the direction of the predetermined change. For example, in the case of expressing an object getting wet with a liquid or in the case of expressing a liquid oozing out from an object, for example, an image representing the object after getting wet or an image representing the object after a liquid oozed out therefrom can be used as the first texture image, and for example, an image representing the object before getting wet or an image representing the object before a liquid oozes out therefrom can be used as the second texture image. In these cases, display priority can be stored in the display priority storage means so as to follow a direction in which the object first gets wet with a liquid. In the case of expressing growth of grass, for example, an image representing the ground after grass grew can be used as the first texture image, and for example, an image representing the ground before grass grows can be used as the second texture image. In this case, display priority can be stored in the display priority storage means so as to follow a direction of growth of grass.

BRIEF DESCRIPTION OF THE DRAWINGS

FIGS. 3A and 3B are views showing the head part of the game character object with a hair texture mapped thereon.

DESCRIPTION OF THE PREFERRED EMBODIMENT

Hereinafter, an embodiment of this invention will be described in detail on the basis of the drawings.

Figure 1:
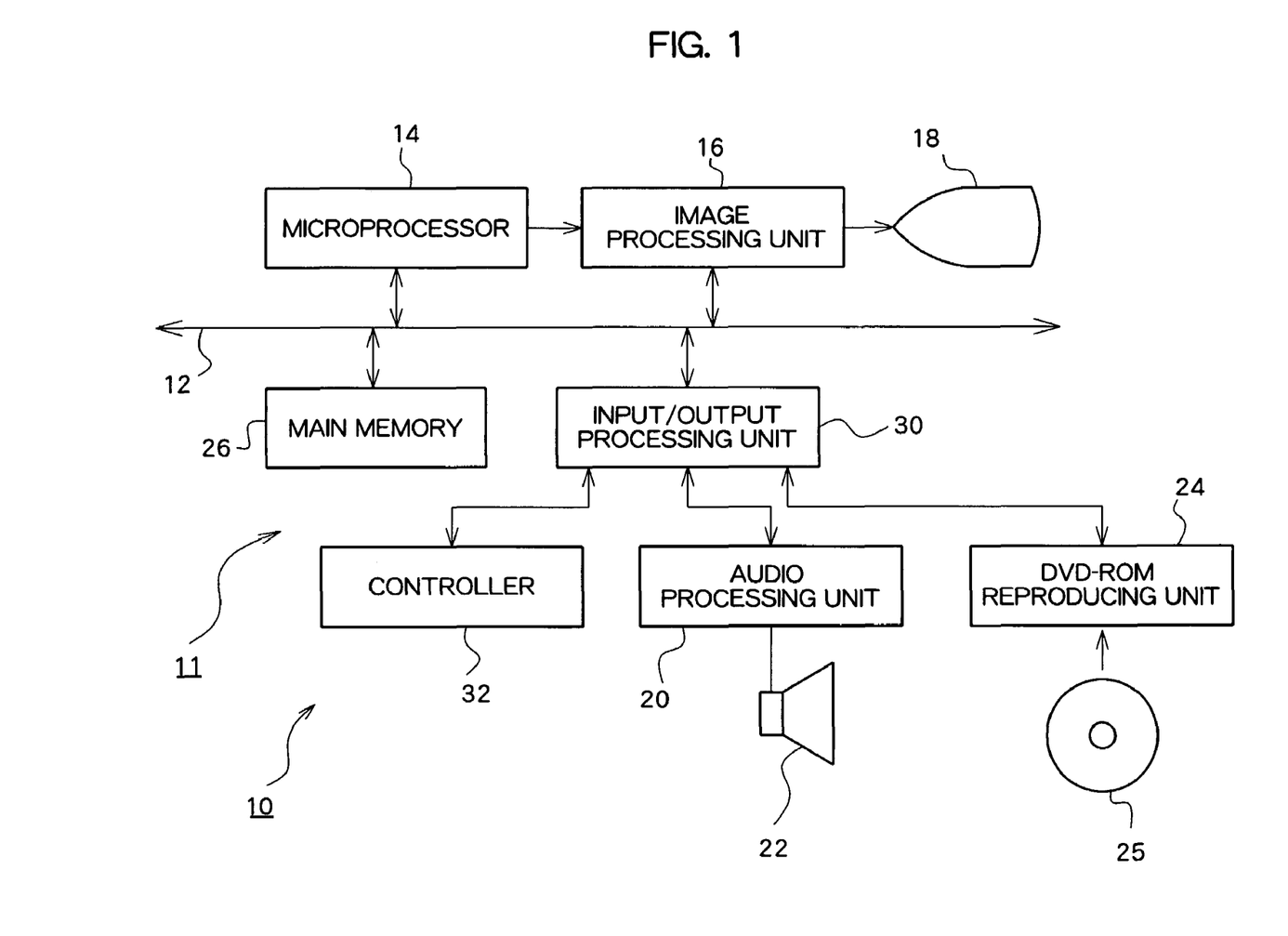
FIG. 1 is a view showing an exemplary hardware structure of a game apparatus (image processing apparatus) according to an embodiment of this invention.

FIG. 1 is a view showing the structure of a game apparatus according to an embodiment of this invention. A game apparatus (image processing apparatus) 10 shown in FIG. 1 is constructed by having a DVD-ROM 25, which is an information storage medium installed in a home game machine (computer game system) 11 connected to a monitor 18 and a speaker 22. In this case, a game program and game data are stored in the DVD-ROM 25, and the game program and game data are read out and supplied to the home game machine 11. However, any information storage medium such as a CD-ROM or ROM card can be used similarly. The game program or game data may also be supplied to the home game machine 11 from a remote location via a communication network.

In the home game machine 11, a microprocessor 14, an image processing unit 16, a main memory 26 and an input/output processing unit 30 are connected with each other by a bus 12 in such a manner that mutual data communication is possible, and a controller 32, an audio processing unit 20 and a DVD-ROM reproducing unit 24 are connected to the input/output processing unit 30. The constituent elements of the home game machine 11 excluding the controller 32 are housed in a casing. A home television receiver, for example, is used as the monitor 18, and for example, its built-in speaker is used as the speaker 22.

The microprocessor 14 controls each part of the home game machine 11 based on an operating system stored in a ROM, not shown, and the game program read out from the DVD-ROM 25 (computer-readable information storage medium). The bus 12 is for communication of an address or data between the parts of the home game machine 11. The main memory 26 includes a RAM, in which the game program or game data read out from the DVD-ROM 25 is written when necessary or which is used as a work area of the microprocessor 14.

The image processing unit 16 includes a VRAM. It receives image data sent from the microprocessor 14 and draws a game screen on the VRAM. It also converts the content of the image data to a video signal and outputs the video signal to the monitor 18 at predetermined timing. That is, the image processing unit 16 receives a vertex coordinate (X, Y, Z), vertex color information (R, G, B), texture coordinate (VX, VY), alpha value and the like of each polygon in a viewing coordinate system, from the microprocessor 14. Using this information, the image processing unit 16 writes color information, Z value (depth information), alpha ($\alpha$) value and the like of each pixel constituting a display image, on the VRAM. This display image is outputted to the monitor 18 at predetermined timing.

When writing a pixel (color information, Z value, alpha value) on the VRAM, a pixel test can be arbitrarily carried out. An alpha test, destination alpha test and depth test are prepared for the pixel test, and an arbitrary pixel test is carried out in accordance with an instruction from the microprocessor 14. In the alpha test, of these tests, the alpha value of a pixel to be drawn and a given reference alpha value are compared with each other, and if a designated condition is not met, drawing of that pixel is restricted. In the destination alpha test, the alpha value (destination alpha value) of a pixel of drawing destination (pixel already drawn at a drawing destination address of VRAM) and a predetermined value (0×80) are compared with each other, and if a designated condition is not met, drawing of that pixel is restricted. In the depth test, the Z value of a pixel to be drawn and the Z value of a Z buffer (prepared in the VRAM) are compared with each other, and if a designated condition is not met, drawing of that pixel is restricted. Moreover, in the case of drawing a pixel on the VRAM, masking can be carried out and writing to the color information, Z value and alpha value of each pixel can be inhibited arbitrarily.

The input/output processing unit 30 is an interface for relaying data communication between each of the controller 32, the audio processing unit 20 and the DVD-ROM reproducing unit 24, and the microprocessor 14. The controller 32 is input means for a player to perform a game operation. The input/output processing unit 30 scans the operation states of various buttons of the controller 32 in a predetermined cycle (for example, every 1/60 seconds), and sends an operation signal representing the result of the scanning to the microprocessor 14 via the bus 12. The microprocessor 14 judges the player's game operation based on the operation signal. The audio processing unit 20 includes a sound buffer. It reproduces data such as music and game sound effects read out from the DVD-ROM 25 and stored in the sound buffer, and outputs the data from the speaker 22. The DVD-ROM reproducing unit 24 reads out the game program and game data recorded in the DVD-ROM 25 in accordance with an instruction from the microprocessor 14.

Hereinafter, a technique of suitably expressing hair (for example, head hair, a beard and the like) of a game character object arranged in a virtual three-dimensional space using the game apparatus 10 having the above-described hardware structure will be described.

Figure 2:
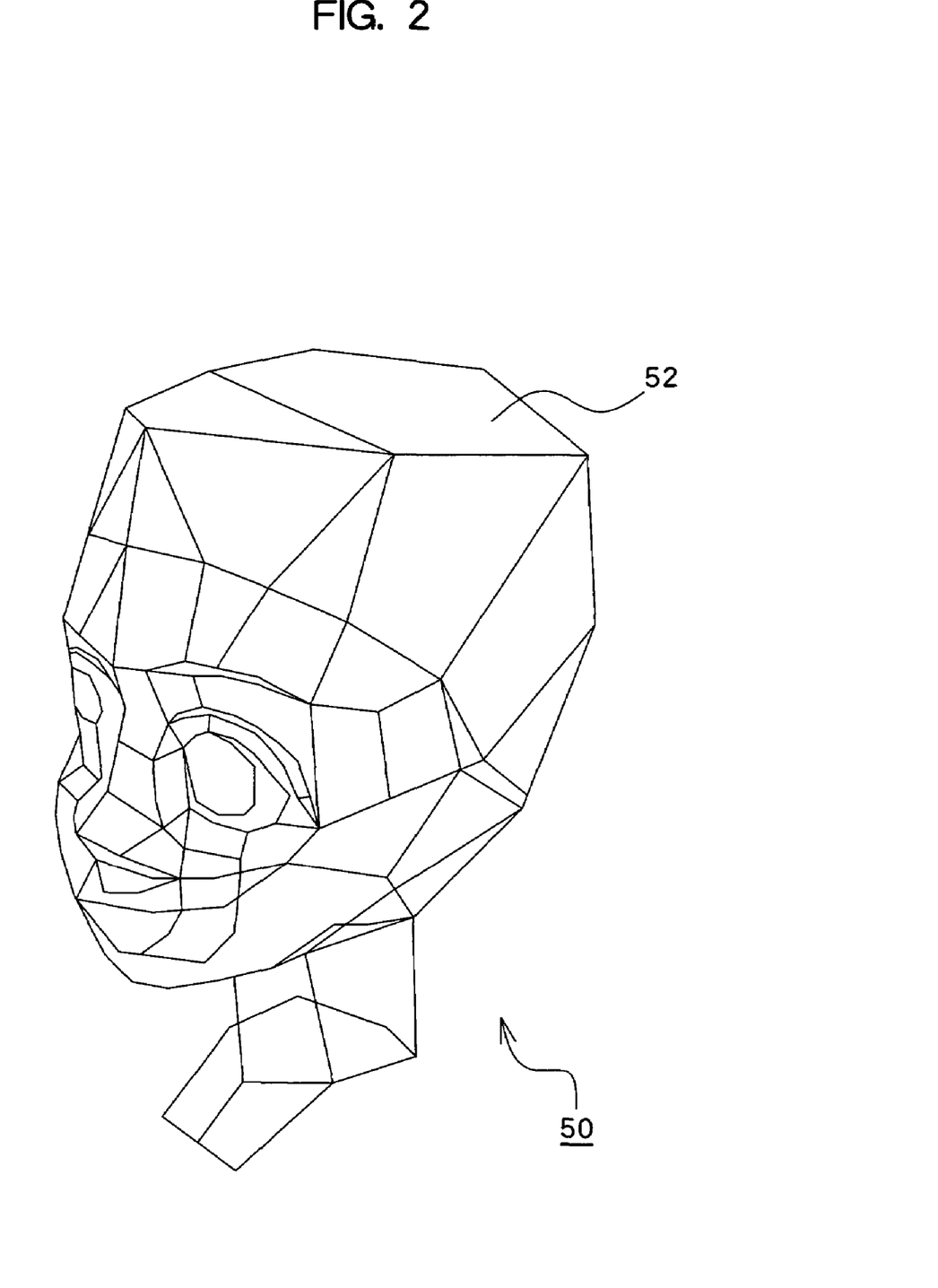
FIG. 2 is a view showing a head part of a game character object formed by polygons.
Figure 3A:
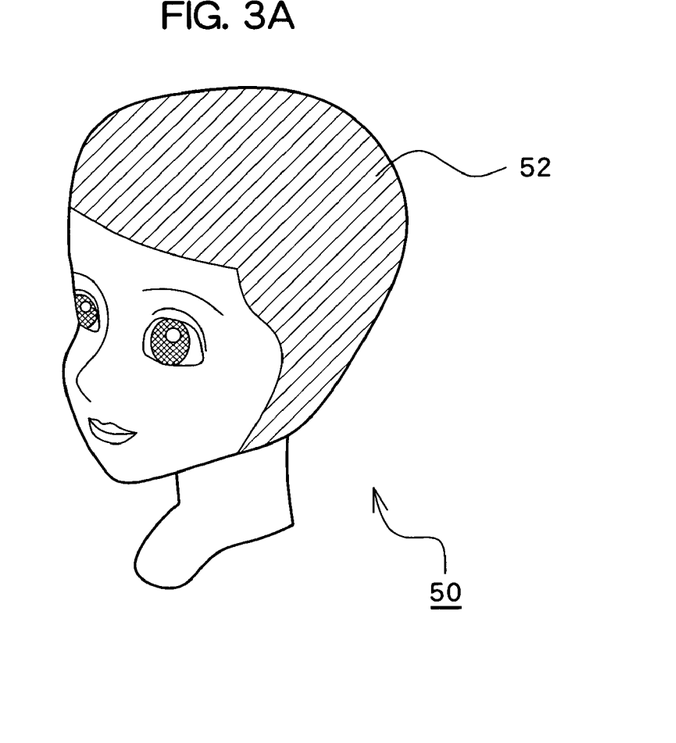
FIG. 3A shows a state where hair has completely grown.
Figure 3B:
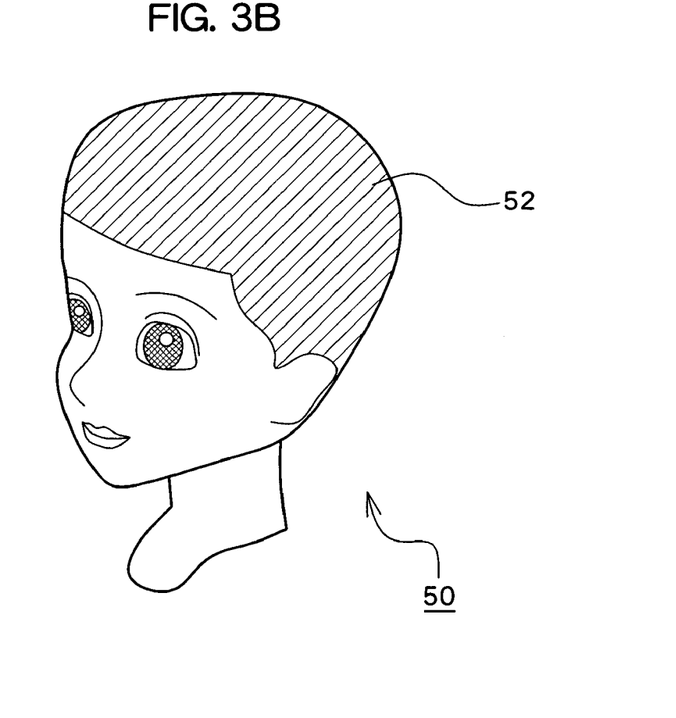
FIG. 3B shows a state where hair has not grown yet at a hem part.

FIG. 2 shows an object representing a game character which appearance is displayed on the monitor 18 by the game apparatus 10. This game character object 50 is formed by polygons and is arranged in a virtual three-dimensional space (game space) constructed on the main memory 26 of the game apparatus 10. On each polygon forming this game character object 50, a texture image representing the appearance of the game character is attached (mapped). The game character object 50 with texture images attached thereon is shown in FIG. 3. Particularly on the polygons forming a head part (head skin part) 52 of this game character object, a skin texture image representing the skin of the game character is mapped and then a hair texture image representing completely grown hair is mapped on the skin texture image. In the case of mapping the hair texture image, only pixels that meet a predetermined condition, of the pixels constituting the hair texture image, are written over the skin texture image, and with respect to the other pixels, color information of the skin texture image is left. The polygons (data) forming the object, and the skin texture image (data) and hair texture image (data) mapped on the polygons are associated with each other in the game apparatus 10. In this manner, the game character object 50 with different lengths of hair is displayed using the same skin texture image and hair texture image, as shown in FIGS. 3A and 3B.

Figure 4A:
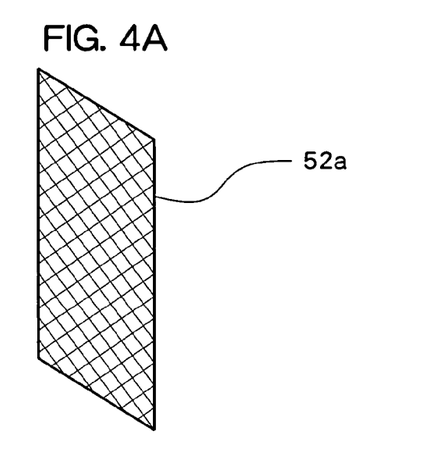
FIG. 4A is a view showing an example of a hair texture.

FIG. 4A is a view showing an example of a hair texture image.

Figure 4B:
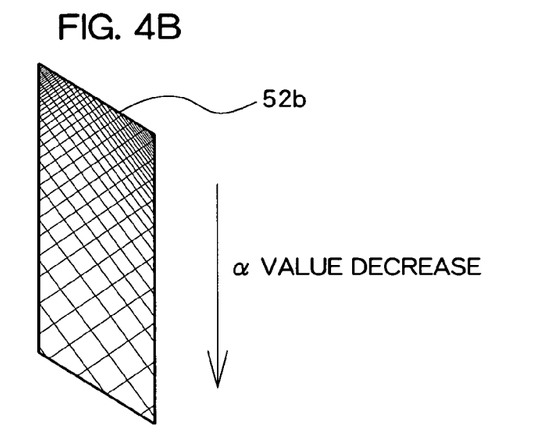
FIG. 4B is a view showing an example of a display priority map.
Figure 4C:
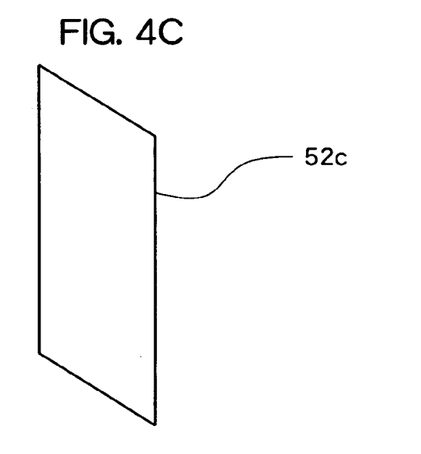
FIG. 4C is a view showing an example of a skin texture.

FIG. 4B is a view showing an example of a display priority map corresponding to the hair texture image. FIG. 4C is a view showing an example of a skin texture image corresponding to the hair texture image. All of these are constituted by information of the same pixel group. A hair texture image 52*a* shown in FIG. 4A represents a state where the hair of the game character has completely grown, and color information representing the color of the hair is caused to correspond to all the pixels. A display priority map 52*b* shown in FIG. 4B represents priority (display priority) in the case of displaying (writing on the VRAM) the color information of each pixel of the hair texture image 52*a*, and the display priority is stored, corresponding to each pixel. In this case, the numerical value expressing the display priority decreases from one side towards the other side of the hair texture image 52*a*. In this embodiment, an alpha channel can be set on the hair texture image 52*a*, and the display priority map 52*b* is comprised of the alpha channel. In this case, the display priority of each pixel is stored as an alpha value of the pixel. Meanwhile, a skin texture image 52*c* shown in FIG. 4C represents the skin of the game character, and color information representing the color of the skin is caused to correspond to each pixel.

In this embodiment, the skin texture image 52*c* is mapped on the polygons forming the head part 52 of the game character object 50 and a display image is drawn on the VRAM. After that, while the display priority map 52*b* corresponding to the skin texture image 52*c* is referred to, the color information recorded in the data of the hair texture image 52*a* corresponding to the skin texture image 52*c*, of a pixel having display priority equal to or higher than a hair quantity parameter (predetermined threshold value), is overwritten (that is, the color information of the pixel is rewritten) The hair quantity parameter can be set in accordance with an operation input by the controller 32 on a setting screen, not shown, and stored in storage means such as the main memory 2 or a memory card (not shown). The hair quantity parameter may also be set or updated on the basis of an output of a timer or calendar, not shown.

Figure 5:
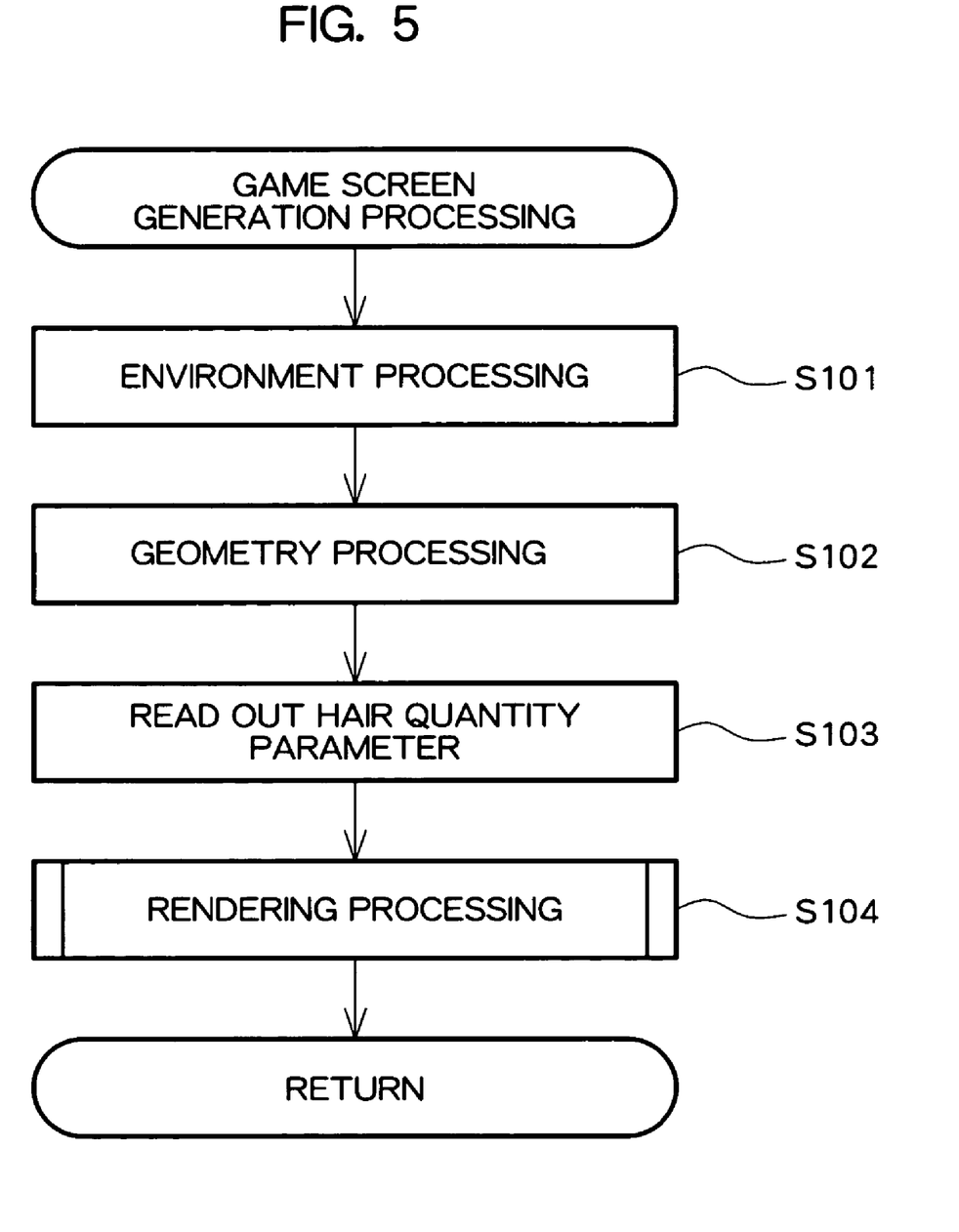
FIG. 5 is a flowchart showing game screen generation processing.

Now, game screen generation processing in the game apparatus 10 will be described. FIG. 5 is a flowchart showing the game screen generation processing executed in the game apparatus 10. This processing is executed in the game apparatus 10 at intervals of predetermined time (for example, every ⅟₆₀seconds) based on the program stored in the DVD-ROM 25.

First, in the game apparatus 10, the microprocessor 14 performs game environment processing (S101) based on the game program and game data read out from the DVD-ROM 25, as shown in FIG. 5. In the game environment processing, the positions and postures of all the static objects and dynamic objects in the virtual three-dimensional space are calculated. The static objects, like building objects or the like, do not change their positions even if the game proceeds. On the other hand, the dynamic objects, like the game character object 50 or vehicle objects or the like, change their positions and postures as the game proceeds. The positions and postures of the dynamic objects change in accordance with the game program and an operation signal inputted from the controller 32. In the game environment processing, also the point of view and the visual field are calculated. Objects out of the visual field are excluded from subjects of the subsequent game processing.

Next, the microprocessor 14 performs geometry processing (S102). In the geometry processing, coordinate transformation from a world coordinate system to a viewing coordinate system is performed. Moreover, color information of vertexes of each polygon forming the objects are corrected based on light source information (color and position of a light source). Furthermore, clipping processing is performed.

After that, the microprocessor 14 reads out the hair quantity parameter that is already set from the storage means such as the main memory 26 (S103). The hair quantity parameter may be set for each game character object, or may be commonly set for all the game characters appearing in the game, or may be set for each hair texture image. At step S103, it suffices to read out only the hair quantity parameter necessary for the subsequent processing.

Next, the microprocessor 14 performs rendering processing (S104). In this processing, the microprocessor 14 sends the vertex coordinate, vertex color information, texture coordinate and alpha value of each polygon belonging to the visual field to the image processing unit 16, and the image processing unit 16 forms a display image on the VRAM based on the information. Here, in the case of mapping the hair texture image 52a on the polygons forming the head part 52 of the game character 50, drawing processing is performed in response to the corresponding hair quantity parameter read out at step S103. The game image formed on the VRAM of the image processing unit 16 is read out at predetermined timing and displayed on the monitor 18.

Figure 6:
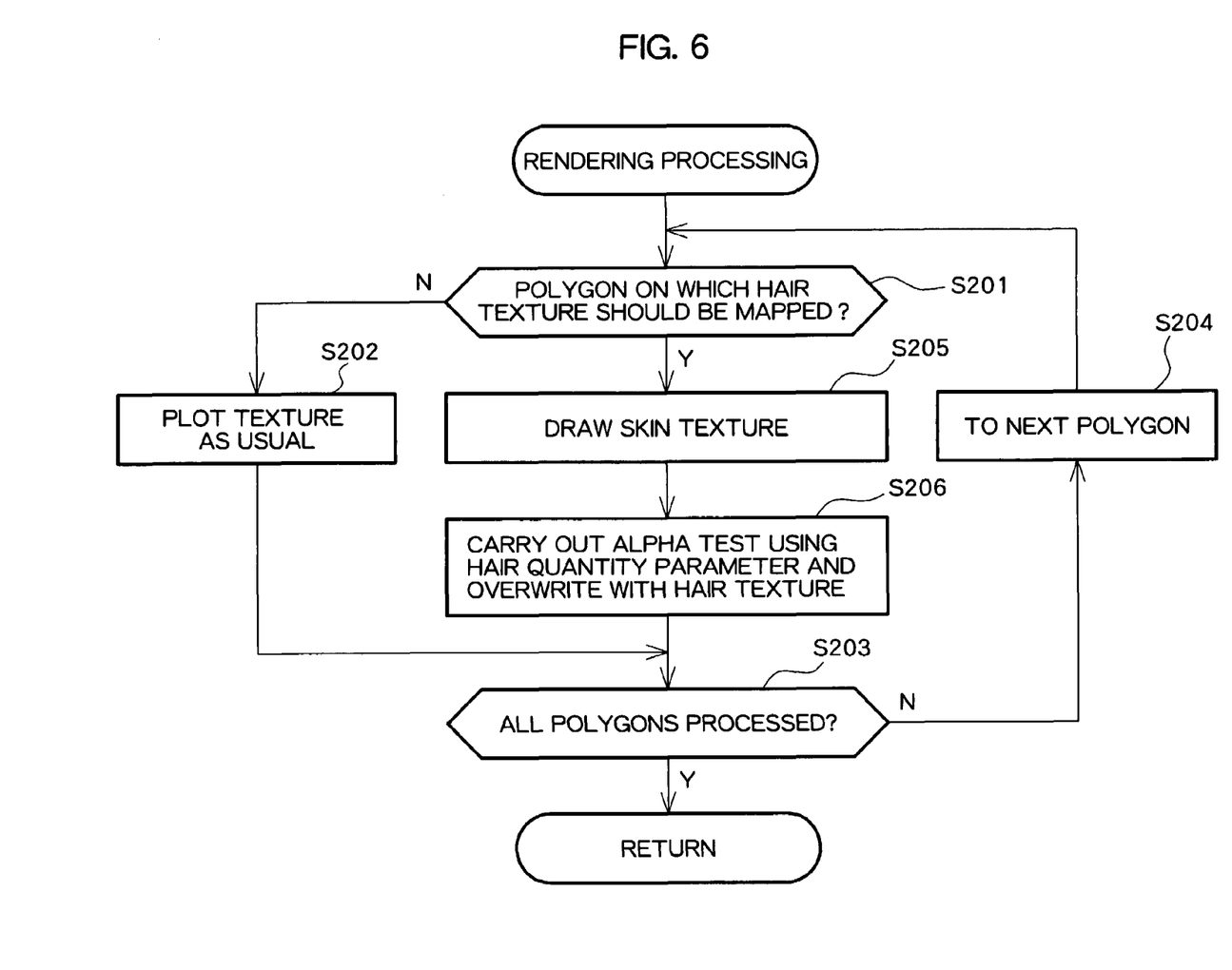
FIG. 6 is a flowchart showing rendering processing.

FIG. 6 is a flowchart showing the details of the rendering processing (S104) of the game screen generation processing shown in FIG. 5. As shown in FIG. 6, in the rendering processing, first, it is judged whether or not a current object being drawn is a polygon on which the hair texture image should be mapped (S201). If it is not such a polygon, a texture image (specified by the texture coordinate) corresponding to that polygon is mapped and a display image is drawn (display image is formed) on the VRAM (S202), as usual. If there is an unprocessed polygon (S203), the processing object shifts to the next polygon (S204) and the processing goes back to the judgment of S201 again.

On the other hand, if it is judged that the current object being drawn is a polygon on which the hair texture image is to be mapped, the skin texture image is read out based on the texture coordinate and it is drawn on the VRAM (S205). Moreover, the alpha test using the hair quantity parameter read out at step S103 is carried out, and in accordance with the result of the test, the hair texture image corresponding to the skin texture image is written over the drawing part of the skin texture image. Specifically, the display priority corresponding to each pixel of the hair texture image is read out, and the display priority and the hair quantity parameter are compared with each other. If the display priority is equal to or higher than the hair quantity parameter, the color information of that pixel recorded in the hair texture image is written to the VRAM, replacing the color information of the corresponding pixel in the skin texture image.

After that, if there is an unprocessed polygon (S203), the processing object shifts to the next polygon (S204) and the processing goes back to the judgment of S201 again. If there is no unprocessed polygon, the rendering processing ends.

With the above-described game apparatus 10, the hair quantity parameter can be changed in accordance with an operation by the controller 32 or with the passage of time, without preparing many hair images, and the hair of the quantity corresponding to the value can be displayed on the head part 52 of the game character object 50.

This invention is not limited to the above-described embodiment. For example, this invention is not limited to image processing related to a game and can be applied to any kind of three-dimensional image processing. For example, this invention can be applied to three-dimensional CG animation, flight simulators, driving simulators and the like.

Although the example of applying this invention to a change of hair is employed in the above description, this invention can be applied to various changes of various objects. That is, if a first texture image representing the appearance of an object before a change, a second texture image representing the appearance of the object after the change, and a display priority map set in accordance with the direction of the change in the object are prepared in advance, the change of the object can be easily expressed.

Figure 7A:
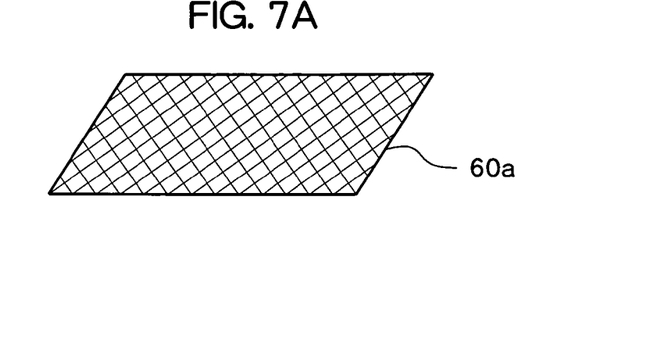
FIG. 7A is a view showing an example of a first texture image.

FIG. 7A is a view showing an example of a first texture image.

Figure 7B:
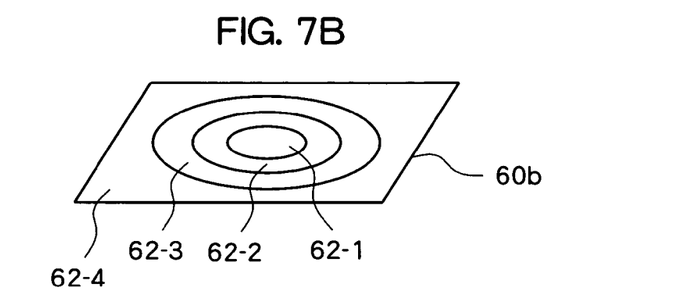
FIG. 7B is a view showing an example of a display priority map.
Figure 7C:
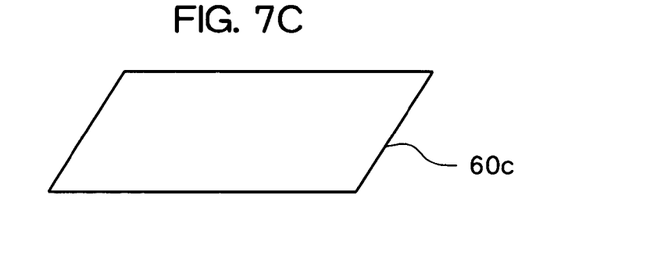
FIG. 7C is a view showing an example of a second texture image.
Figure 7D:
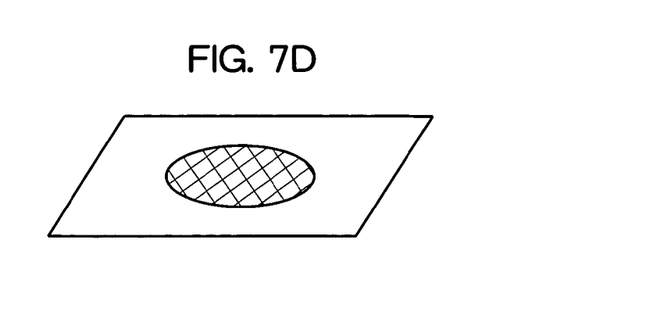
FIG. 7D is a view showing an example of a display image.

FIG. 7B is a view showing an example of a display priority map corresponding to the first texture image. FIG. 7C is a view showing an example of a second texture image corresponding to the first texture image. FIG. 7D is a view showing an example of a display image using these images and map.

All of the first and second texture images and the display priority map are constituted by information for the same pixel group. A first texture image 60a shown in FIG. 7A is an image that is mapped, for example, on a floor polygon. It is an image representing the entire floor being wet. A display priority map 60b shown in FIG. 7B expresses the priority (display priority) in the case of displaying (drawing on the VRAM) the color information of each pixel of the first texture image 60a, and the display priority is stored corresponding to each pixel. The display priority map 60b represents the direction of a change occurring in an object associated with the first and second texture images, and it is prepared in such a manner that its value changes in accordance with the direction of the change. In this case, the numerical value expressing the display priority decreases from the center of the first texture image 60a toward its peripheral part. That is, the display priority map 60b is sectioned into areas 62-1 to 62-4, and in this order, the display priority corresponding to a pixel situated in each area decreases. Although the display priority is changed by area in this case, it is a matter of course that the display priority may also be changed by pixel.

In this embodiment, an alpha channel can be set on the first texture image 60a, and the display priority map 60b is comprised of the alpha channel. In this case, the display priority of each pixel is stored as an alpha value of the pixel. Meanwhile, a second texture image 60c shown in FIG. 7C is, for example, an image representing a floor that is not wet at all. Using the first texture image 60a, the second texture image 60c and the display priority map 60b, for example, a display image shown in FIG. 7D is acquired. The display image shown in FIG. 7D is displayed in the case where such a threshold value is set that the first texture image 60a is actually drawn for the pixels situated in the areas 62-1 and 62-2 while the color information of the second texture image 60c is left on the VRAM for the other pixels. With the above-described construction, various changes of various objects can be suitably displayed.

What is claimed is:

1. An image processing apparatus for displaying an image of a character, characterized in that the apparatus includes
   hair texture image storage means for storing a hair texture image representing hair of the character,
   skin texture image storage means for storing a skin texture image representing skin of the character,
   display priority storage means for storing display priority given to each pixel constituting the hair texture image,
   threshold value storage means for storing a threshold value of the display priority,
   skin texture image drawing means for drawing the skin texture image stored in the skin texture image storage means on a polygon representing the character, and
   hair texture image drawing means for drawing the hair texture image stored in the hair texture image storage means on the polygon on which the skin texture image has been drawn by the skin texture image drawing means, in response to a result of comparison between the display priority stored in the display priority storage means and the threshold value stored in the threshold value storage means.

2. The image processing apparatus as claimed in claim 1, characterized in that the hair texture image drawing means performs drawing of each pixel in relation to the polygon on which the skin texture image has been drawn by the skin texture image drawing means, in response to the result of comparison between the display priority given to the pixel stored in the display priority storage means and the threshold value stored in the threshold value storage means.

3. The image processing apparatus as claimed in claim 2, characterized in that the display priority storage means stores the display priority given to each pixel as an alpha value of the hair texture image.

4. An image processing method for displaying an image of a character, characterized in that the method includes
   a hair texture image storage step of storing a hair texture image representing hair of the character to hair texture image storage means,
   a skin texture image storage step of storing a skin texture image representing skin of the character to skin texture image storage means,
   a display priority storage step of storing display priority given to each pixel constituting the hair texture image to display priority storage means,
   a threshold value storage step of storing a threshold value of the display priority to threshold value storage means,
   a skin texture image drawing step of drawing the skin texture image stored in the skin texture image storage means on a polygon representing the character, and
   a hair texture image drawing step of drawing the hair texture image stored in the hair texture image storage means on the polygon on which the skin texture image has been drawn by the skin texture image drawing means, in response to a result of comparison between the display priority stored in the display priority storage means and the threshold value stored in the threshold value storage means.

5. A computer-readable information storage medium having a program stored therein, the program being adapted for causing a computer to function as an image processing apparatus for displaying an image of a character,
   the program including commands to cause the computer to function as
   hair texture image storage means for storing a hair texture image representing hair of the character,
   skin texture image storage means for storing a skin texture image representing skin of the character,
   display priority storage means for storing display priority given to each pixel constituting the hair texture image,
   threshold value storage means for storing a threshold value of the display priority,
   skin texture image drawing means for drawing the skin texture image stored in the skin texture image storage means on a polygon representing the character, and
   hair texture image drawing means for drawing the hair texture image stored in the hair texture image storage means on the polygon on which the skin texture image has been drawn by the skin texture image drawing means, in response to a result of comparison between the display priority stored in the display priority storage means and the threshold value stored in the threshold value storage means.

6. An image processing apparatus characterized in that the apparatus includes
   first texture image storage means for storing a first texture image,
   second texture image storage means for storing a second texture image,
   display priority storage means for storing display priority given to each pixel constituting the first texture image,
   threshold value storage means for storing a threshold value of the display priority,
   second texture image drawing means for drawing the second texture image stored in the second texture image storage means on a polygon associated with the first and second texture images, and
   first texture image drawing means for drawing the first texture image stored in the first texture image storage means on the polygon on which the second texture image has been drawn by the second texture image drawing means, in response to a result of comparison between the display priority stored in the display priority storage means and the threshold value stored in the threshold value storage means.

7. The image processing apparatus as claimed in claim 6, characterized in that the first texture image is an image representing an object associated with the polygon after a predetermined change occurred in the object, the second texture image is an image representing the object associated with the polygon before the predetermined change occurs in the object, and the display priority storage means stores the display priority to follow the direction of the predetermined change.

8. An image processing method characterized in that the method includes a first texture image storage step of storing a first texture image to first texture image storage means, a second texture image storage step of storing a second texture image to second texture image storage means, a display priority storage step of storing display priority given to each pixel constituting the first texture image to display priority storage means, a threshold value storage step of storing a threshold value of the display priority to threshold value storage means, a second texture image drawing step of drawing the second texture image stored in the second texture image storage means on a polygon associated with the first and second texture images, and a first texture image drawing step of drawing the first texture image stored in the first texture image storage means on the polygon on which the second texture image has been drawn by the second texture image drawing means, in response to a result of comparison between the display priority stored in the display priority storage means and the threshold value stored in the threshold value storage means.

9. A computer-readable information storage medium having a program stored therein, the program being adapted for causing a computer to function as first texture image storage means for storing a first texture image, second texture image storage means for storing a second texture image, display priority storage means for storing display priority given to each pixel constituting the first texture image, threshold value storage means for storing a threshold value of the display priority, second texture image drawing means for drawing the second texture image stored in the second texture image storage means on a polygon associated with the first and second texture images, and first texture image drawing means for drawing the first texture image stored in the first texture image storage means on the polygon on which the second texture image has been drawn by the second texture image drawing means, in response to a result of comparison between the display priority stored in the display priority storage means and the threshold value stored in the threshold value storage means.

* * * * *